United States Patent

[11] 3,589,205

| [72] | Inventor | Zeljko Radovic<br>Aarau, Switzerland |
|---|---|---|
| [21] | Appl. No. | 814,541 |
| [22] | Filed | Apr. 9, 1969 |
| [45] | Patented | June 29, 1971 |
| [73] | Assignee | Sybron Corporation<br>Rochester, N.Y. |
| [32] | Priority | July 11, 1968 |
| [33] | | Germany |
| [31] | | P 17 55 926.1 |

[54] RACK AND PINION SYNCHRONIZING MECHANISM
6 Claims, 2 Drawing Figs.

[52] U.S. Cl. ............................................. 74/422,
74/411, 105/29, 105/30, 105/127, 105/131, 295/4
[51] Int. Cl. ..................................................... B61c 11/04,
F16h 1/04, F16h 57/00
[50] Field of Search............................................ 74/422,
411; 105/29, 30, 127, 131; 295/4

[56] References Cited
UNITED STATES PATENTS

| 349,624 | 9/1886 | Abt .............................. | 105/29 X |
| 991,954 | 5/1911 | Charbonneau ............... | 105/29 |
| 3,429,280 | 2/1969 | Dashem et al. ................ | 105/29 |
| 3,443,449 | 5/1969 | Kotarski ....................... | 74/422 |

FOREIGN PATENTS

| 57,432 | 6/1911 | Switzerland .................. | 105/29 |

Primary Examiner—Arthur L. La Point
Assistant Examiner—Howard Beltran
Attorney—Theodore B. Roessel ABSTRACT: A synchronizing mechanism to effect smooth interference free transition from friction to positive drive is accomplished by a gear 22 mounted on a drive shaft 10, which gear 22 is carried into engagement with an axially movable rack 24 to move the rack axially with respect to the positive drive track portion 20 against the force of a spring 26 until the gear and rack are meshed. The rack is then moved by the meshed gear against a stop 28 which orients the positive drive means 16 for smooth friction free engagement with the positive drive portion 20.

PATENTED JUN29 1971 3,589,205

INVENTOR.
ZELJKO RADOVIC
BY
*Theodore W. Koenel*
ATTORNEY

RACK AND PINION SYNCHRONIZING MECHANISM

Background of the Invention

The present invention relates to a rail-guided vehicle having a friction drive means and a positive drive engageable with the rail wherein the positive drive is engaged for only a portion of the travel of the vehicle. More specifically, the present invention relates to a device for effecting the smooth transition from friction to positive drive while the vehicle is in motion. Rail-guided vehicles, such as monorails which permit a programmed transportation of material to unloading and loading stations are already in use in factories, offices, hospitals and the like. These transport vehicles usually have a drive shaft on which is mounted one or more wheels which frictionally engage the monorail track. In cases where the track extends through a horizontal path of travel, the weight of the transport vehicle usually exerts a sufficient load on the friction drive wheels so that the vehicles can move along the track without the friction drive wheels slipping. However, in cases where the track extends vertically, the force exerted by the friction drive wheels against the track is insufficient to overcome the weight of the transport vehicle so that the friction drive wheels alone are unable to move the transport vehicle vertically. Therefore, an additional drive means such as a positive drive is necessary to move the transport vehicle along vertical sections of the track. Such a positive drive can take the form of a chain and sprocket or a tooth system or the like, such as a rack or similar device on the vertical section of track and a drive pinion on the transport vehicle.

The problem with such dual drive vehicles is in making the transition from friction to positive drive smoothly and without stopping the transport vehicle. The greatest difficulty is in engaging the positive drive means on the vehicle with the positive drive portion of the track smoothly and with a minimum of shock and noise. Any interference with the rotating positive drive and the positive drive portion of the track will, of course, increase the risk of damage to components of the drive means or at the very least may present the danger of spilling the material being transported. In the case of offices and hospitals, another disadvantage is the noise created by any interference between the drive means and the positive drive portion of the track.

SUMMARY OF THE INVENTION

In the present invention, a rail-guided vehicle is driven horizontally by a drive wheel which frictionally engages the horizontal section of monorail track. For vertical courses of travel, the vehicle is provided with a positive drive wheel which engages a positive drive section of the track. Immediately preceeding the positive drive section of track is an axially movable, spring-biased rack, adapted to mesh with a gear mounted for corotation with both the friction drive wheel and the positive drive wheel. Misalignment of the gear and rack causes the rack to move laterally with respect to the rail until meshing occurs. Thereafter, the rack is driven toward the positive drive section of the track and into engagement with a stop, the gear and positive drive wheel being oriented so that meshing of the gear and rack and abutment of the rack against the stop places the positive drive wheel in the correct orientation to mesh smoothly with a positive drive section of the track.

OBJECTS OF THE INVENTION

It is the primary object of the invention to provide a transporter vehicle for a monorail system having both a friction and a positive drive means in which the transition from friction to positive drive is made with a minimum of shock and noise.

Another object of the present invention is to provide means for making a transition from friction drive to positive drive which reduces the wear of the friction drive resulting from slippage during engagement of the positive drive means.

A further object of the invention is to provide means for making the transition from friction to positive drive without stopping the forward motion of the transport vehicle.

Yet another object of this invention is to provide means for orienting a moving positive drive member with respect to a stationery positive drive member to permit said members to mesh smoothly and without interference.

These and other objects, advantages and characterizing features of the invention will become more apparent upon consideration of the following detailed description thereof when taken in connection with the accompanying drawings.

Description of the Preferred Embodiment

Figure 2:
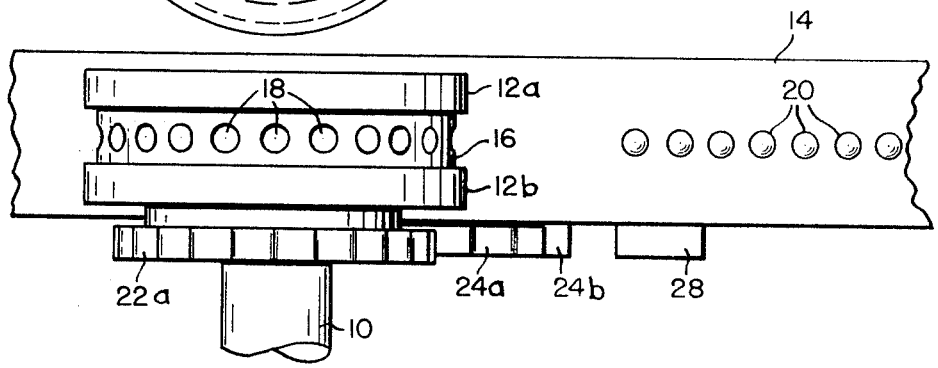
FIG. 2 is a front view of the apparatus shown in FIG. 1.

Referring to the drawings the transport vehicle according to the invention has two drive shafts indicated at 10. Mounted on each drive shaft is a friction drive wheel 12 consisting of two portions 12a and 12b (FIGURE 2). These friction drive wheels are adapted to frictionally engage a track 14 to drive the transport vehicle along horizontal courses of travel.

Also mounted on drive shaft 10 and between the friction drive portions 12a and 12b is an apertured positive drive wheel 16 (FIG. 2). The apertures 18 of wheel 16 are equally spaced and extend radially inward from the periphery of the wheel so as to engage a series of equally spaced bolts or pins 20 provided on each side of track 14. These bolts or pins 20 comprise the positive drive rack section of the trackway as for example, during vertical courses of travel.

The rack and pinion synchronizing mechanism has mounted on each drive shaft 10 a pinion gear 22a and 22b which is adapted to orient positive drive wheels 16 for smooth, interference free engagement with bolts 20 in a manner set out herein below. Gears 22a and 22b are smaller in diameter than friction drive wheels 12 and are adapted to mesh with a traveling rack 24a and 24b respectively, located immediately in front of the positive drive rack section of the track represented by bolts 20. Each traveling rack is longitudinally moveable with respect to the rail and is fastened at one end to the rail by a spring element shown schematically in FIGURE 1 by the single spring element 26, the traveling rack sections being moveable independently of each other in a direction of motion toward or away from a stationery stop 28 provided on track 14. The first tooth 30a and 30b of each rack 24a and 24b respectively, is pivoted to the traveling rack and biased by a spring 32 to move in the plane of the rack.

It should be pointed out that while the diameter of gears 22a and 22b is smaller than the diameter of positive drive wheel 16, the relationship of the gears, positive drive wheels 16, racks 24a and 24b and bolts 20 is such that when the gears and the traveling racks are meshed and the racks abutted against stop 28, the apertures 18 of positive drive wheel 16 will be in correct orientation to mesh smoothly with bolts 20.

Figure 1:
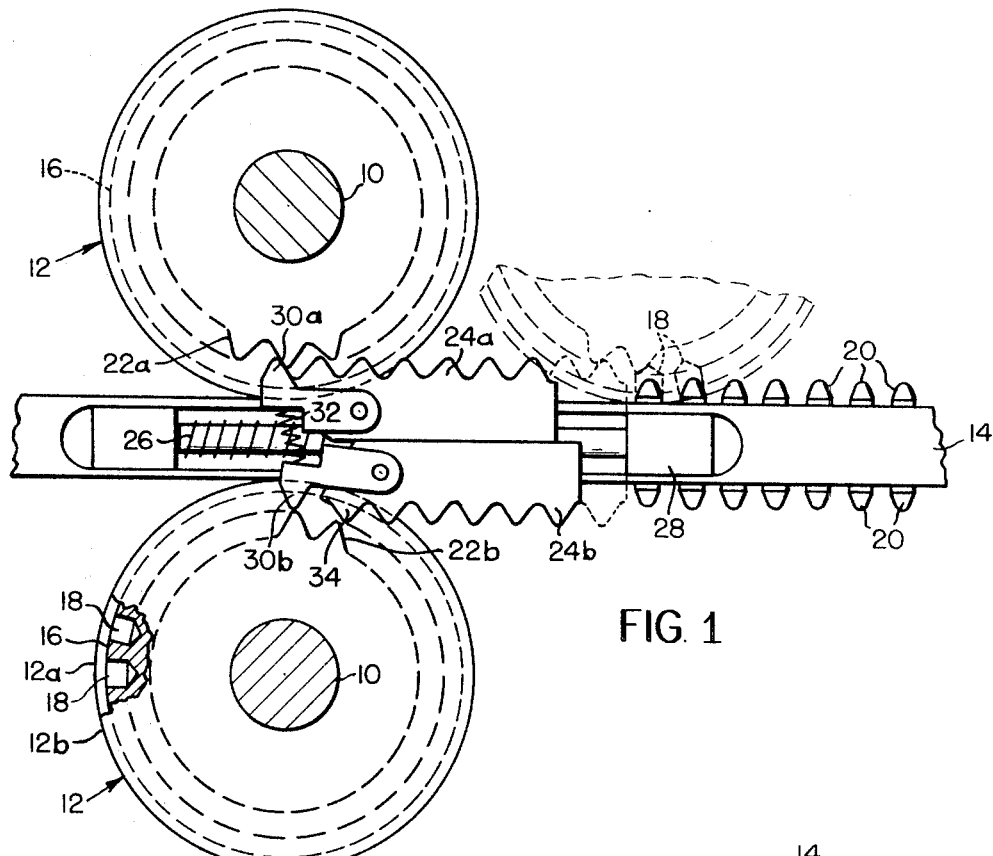
FIG. 1 is a plan view of the gear orienting means of the present invention.

In order to describe the operation of the present invention and by way of illustration only, assume that the transport vehicle is in friction drive with drive wheels 12 rotating so as to move the transport vehicle from left to right as viewed in FIG. 1 and toward the positive drive rack portion of the track represented by bolts 20. If, for example, gear 22a first engages the right flank of the first tooth 30a of rack 24a, the rotation of the gear will cause the traveling rack to move to the left until the gear and rack are in proper meshing engagement. However, if for example, gear 22b engages the crown of the first tooth 30b of rack 22b, the tooth will be depressed against the bias of spring 32 thereby increasing the pitch from the first tooth 30b to the following tooth 34 of the rack. The next tooth of gear 22b will now engage on the left flank of tooth 34 as shown in FIGURE 1 and will move rack 24b to the right until the gear and rack are in proper meshing engagement.

As stated herein above the diameter of drive wheels 12 is greater than the diameter of gears 22a and 22b so that with the gears correctly meshed with their respective racks, the friction drive wheels will cause both the gears and the traveling racks to move to the right as viewed in FIG. 1 until the racks engage stop 28. With the racks abutting against stop 28 apertures 18 of positive drive wheel 16 are in the correct orientation to mesh smoothly with bolts 20 as shown in phantom in FIG. 1.

As positive drive wheels 16 move along the positive drive section of the rail, gears 22a and 22b run off from racks 24a and b respectively so that the racks can be drawn by spring 26 back to their original position.

Thus, it would be appreciated that the present invention accomplishes it intended objects by providing a means for effecting the smooth transition from friction to positive drive with a minimum of shock and noise. Racks 24a and b being resiliently mounted provide the means to absorb much of the shock prior to the engagement of drive wheels 16 with bolts 20. Shock and noise is further minimized by having the first tooth of each rack resiliently mounted.

Having thus described the invention in detail, what I claim as new is:

1. Rack and pinion synchronizing means to engage a rack and pinion drive for use with rail guided vehicles having a drive shaft and a drive pinion, said means comprising:
   a. a rail having both a friction drive portion and a positive drive rack section, said positive drive rack section being engageable with said drive pinion on said vehicle for only a portion of travel of said vehicle;
   b. a traveling rack mounted on said rail preceding said positive drive rack section, said traveling rack being movable through a path of travel longitudinally with respect to said rail;
   c. resilient means normally maintaining said traveling rack at an intermediate point in the path of travel of said traveling rack;
   d. orienting means on said vehicle adapted to engage and drive said traveling rack through said path of travel and toward said positive drive rack section; and
   e. a stop disposed in the path of travel of said traveling rack for limiting the movement thereof towards said positive drive rack section, said stop being located so that engagement of said traveling rack and orienting means and abutment of said traveling rack against said stop locates said vehicle drive pinion for smooth friction free engagement with said positive drive rack section.

2. A combination as set forth in claim 1 wherein said orienting means comprises a pinion gear mounted on said vehicle drive shaft, said gear being adapted to mesh with said traveling rack and being smaller in diameter than said friction drive means.

3. A combination as set forth in claim 2 wherein the first tooth of said traveling rack disposed for engagement with said pinion gear is resiliently mounted on said traveling rack.

4. Rack and pinion synchronizing means to engage a rack and pinion drive for use with guided vehicles having a drive shaft, a friction drive wheel and a positive drive pinion, said means comprising:
   a. a rail having both a friction drive portion and a positive drive rack section, said positive drive rack section being engageable with said positive drive pinion on said vehicle for only a portion of travel of said vehicle;
   b. a traveling rack mounted on said rail preceding said positive drive rack section, said rack being movable through a path of travel longitudinally with respect to said rail;
   c. bias means urging said traveling rack to an intermediate point in said path of travel;
   d. a stop on said rail to limit movement of said traveling rack in the direction toward said positive rack section; and
   e. a gear mounted on said drive shaft adapted to mesh with said traveling rack, said gear engaging and moving said traveling rack longitudinally with respect to said rail until said gear and traveling rack are meshed and thereafter moving said traveling rack against said bias and toward said stop, said gear, traveling rack, stop and said vehicle positive drive pinion and said rail positive drive rack section being so oriented that meshing of said gear and traveling rack and location of said traveling rack against said stop will cause said vehicle positive drive pinion and said rail positive drive rack section to mesh smoothly.

5. A combination as set forth in claim 4 wherein the first tooth of said traveling rack in the direction of movement of said vehicle is pivotally mounted on said traveling rack and spring biased to resist movement upon engagement by said gear on said vehicle drive shaft.

6. A combination as set forth in claim 4 wherein said gear is smaller in diameter than said friction drive means.